United States Patent [19]
Sperber et al.

[11] Patent Number: 6,007,043
[45] Date of Patent: Dec. 28, 1999

[54] DEVICE FOR HOLDING DOWN AND RELEASING SOLAR PANELS

[75] Inventors: Franz Sperber, Kolbermoor; Walter Stich, Miesbach, both of Germany

[73] Assignee: DaimlerChrysler AG, Munich, Germany

[21] Appl. No.: 08/762,975

[22] Filed: Dec. 10, 1996

[30] Foreign Application Priority Data

Dec. 21, 1995 [DE] Germany .......................... 195 48 002

[51] Int. Cl.$^6$ ................................... F16M 13/00
[52] U.S. Cl. ............................. 248/548; 411/20
[58] Field of Search ................... 248/507, 508, 248/509, 548; 403/167, 168; 411/5, 19, 20, 546, 535

[56] References Cited

U.S. PATENT DOCUMENTS

| 4,347,023 | 8/1982 | Rizos | 248/507 |
| 5,116,175 | 5/1992 | Adini | 411/20 |

*Primary Examiner*—Ramon O. Ramirez
*Attorney, Agent, or Firm*—McGlew and Tuttle, P.C.

[57] ABSTRACT

A device for holding down solar panels with a holding-down bolt and for releasing the solar panels after shearing off with a pyrotechnical striking pin device is arranged on the outer side of the solar panels. After severing with the striking pin and after lifting out of the striking pin device with a spring, the holding-down bolt pivots out of spacers, which are connected to the solar panels via crossbolts, as a result of which the solar panels can be freely unfolded.

11 Claims, 3 Drawing Sheets

DEVICE FOR HOLDING DOWN AND RELEASING SOLAR PANELS

FIELD OF THE INVENTION

The present invention pertains to a device for holding down and clamping together solar panels with a holding-down bolt, and for releasing the solar panels after the holding-down bolt has been shorn off, particularly on remotely controlled space craft.

BACKGROUND OF THE INVENTION

Prior-art holding-down devices are arranged within the surface of the panels occupied by the solar cells. The area occupied by solar cells must be interrupted at the holding-down devices, as a result of which the solar panels cannot be fully utilized with solar cells. Furthermore, the cabling of the solar cells must be laid around the cutouts for the holding-down devices. The manufacture of the prior-art solar panels is also expensive because the holding-down devices with their distance bushes and guide bushes must be introduced into the panels. In addition, a capturing bush for the shorn-off holding-down bolts is currently necessary above the panel surface, as a result of which solar cells are shaded. Another drawback of the prior-art design is that when the solar panels are folded up, the main part of the holding-down bolt remaining after shearing off must be pivoted out through the guide bushes in the panels without contact. This requires an exact kinematic movement process and, corresponding to the unfolding analysis, a correspondingly large hole diameter for the guide bushes.

SUMMARY AND OBJECTS OF THE INVENTION

The basic object of the present invention is to provide a holding-down device which does not disturb the homogeneous compound arrangement of the solar cells and also fails to cause shading of the cells.

This object is accomplished by the holding-down device being arranged on an outer side of the solar panels. Advantageous embodiments of the present invention are characterized in the subclaims.

The arrangement of the holding-down device on an outer side of the solar panels offers a number of advantages. The area covered by solar cells in the solar panels is not interrupted by the holding-down device. The holding-down device can be mounted on the outside of the panels with ease and without problems. The support structure for the solar panels has a simple structure, because the force is introduced through the holding-down device in the edge area. After the holding-down bolt has been severed by the pyrotechnically triggered striking pin, the shorn-off holding-down bolt no longer jumps all the way up, but it pivots laterally away and remains located in parallel underneath the surface of the solar cell. As a result, the solar cells are not shaded by the holding-down bolt. The holding-down device is independent from the distance from the folding axis of the solar panels. Manufacturing tolerances occurring during mounting in the panels are compensated via an annular gap between the hole in the panels and the crossbolt, which is filled with reactive resin.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
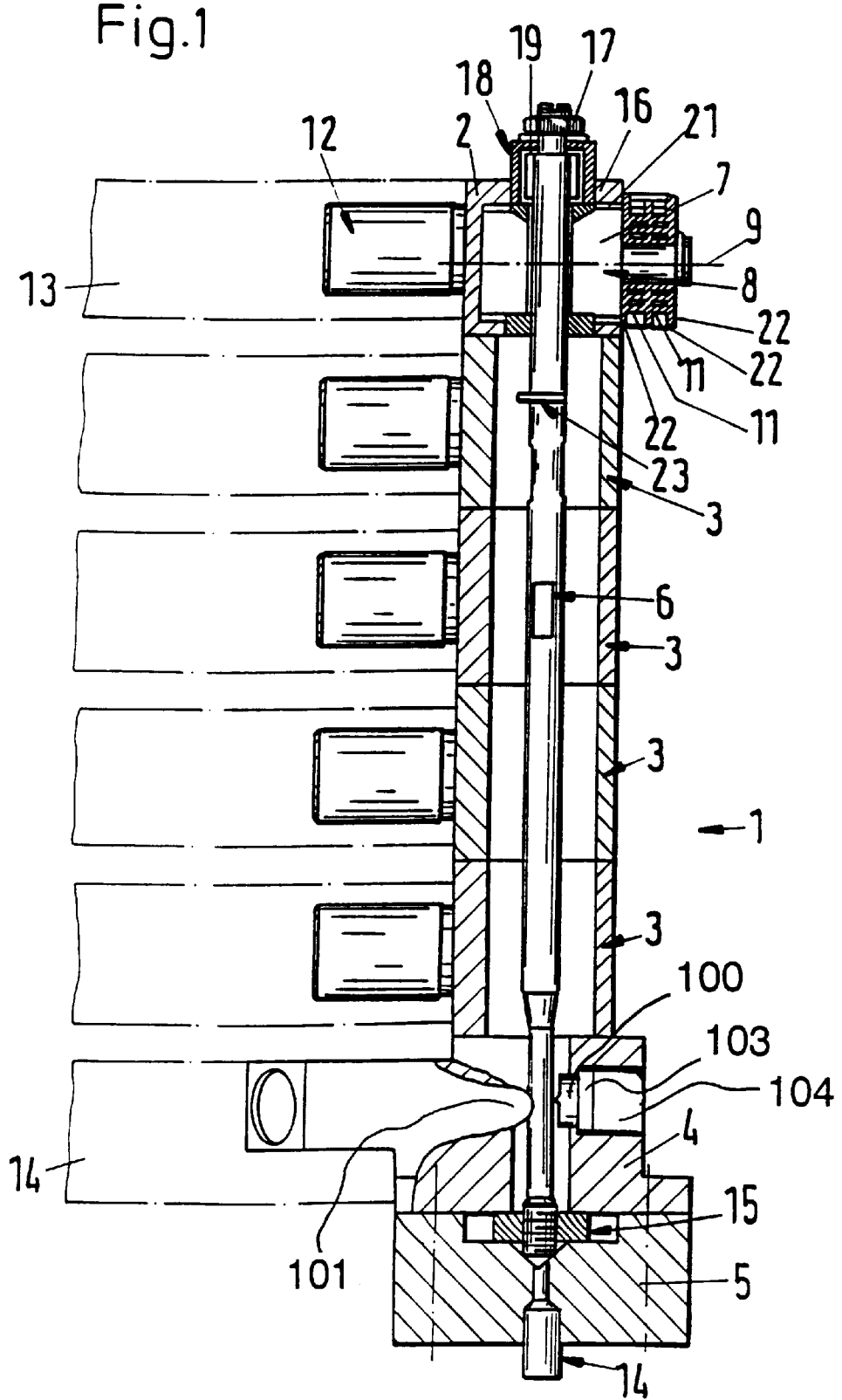
FIG. 1 is a cross section through a holding-down device.

A holding-down device 1 is composed essentially of a plurality of appendages including a head part or end appendage 2 and four spacers or intermediate appendages 3 mounted on an edge of the panels, a shearing off means such as a pyrotechnical striking pin device 4, a base plate 5, and a holding-down bolt 6 passing through the above-mentioned parts. The striking pin device 4 and the base plate 5 are shown rotated by 90°. A pivoting means including a nut or block 7 with a pin 8, the nut or block 7 has an opening receiving the holding-down bolt 6. The nut or block 7 pivots the holding-down bolt around an axis 9 under the force of two torsion springs 11 after the release of the holding-down bolt 6. The nut is arranged within the head part 2. Crossbolts 12, which can be inserted into solar panels 13, represented by dash-dotted lines, by means of reactive adhesives, are placed on the side of the head part 2 and the spacers 3. A structure 14 of the solar panels is indicated by a dash-dotted line to the side of the striking pin device 4. The holding-down bolt 6 is centered in the base plate 5 with an alignment pin 14, and it is fastened at the bottom by means of a base nut 15 inserted into the base plate 5. The holding-down bolt 6 is guided at the top end by a spherical washer 16 inserted into the nut 7. An end nut 17 clamps together the head part 2, the spacers 3, and the striking pin device 4 via a sleeve 18 and the nut 7 against the pressure of the lower base nut 15, as a result of which the panels 13 will also lie one on top of another under pretension. A lifting means including a compression spring 19 is placed into the sleeve 18 under pretension. The nut 7 is mounted in the head part 2 with bearing bushes 21, and the torsion springs 11 are separated from one another and laterally guided by three distance washers 22. Finally, there also is a stop element 23, which limits the upward darting/swinging-out movement of the holding-down bolt 6 after it is shorn off, and there is a bearing bush 24 that is in contact with the nut 7.

The striking pin device or shearing device 4 includes a cutting element 100 and a receiver 101. The holding-down bolt is positioned between the cutting element 100 and the receiver 101. A pyrotechnical charge 103 is positioned adjacent the cutting element 100. When the pyrotechnical charge 103 is ignited, it pushes a cutting element 100 against the bolt 6 to sever the bolt 6. The pyrotechnical charge can be held in the striking pin device 4 by a plug which is fastened into an opening 104 of the striking pin device 4.

Figure 2:
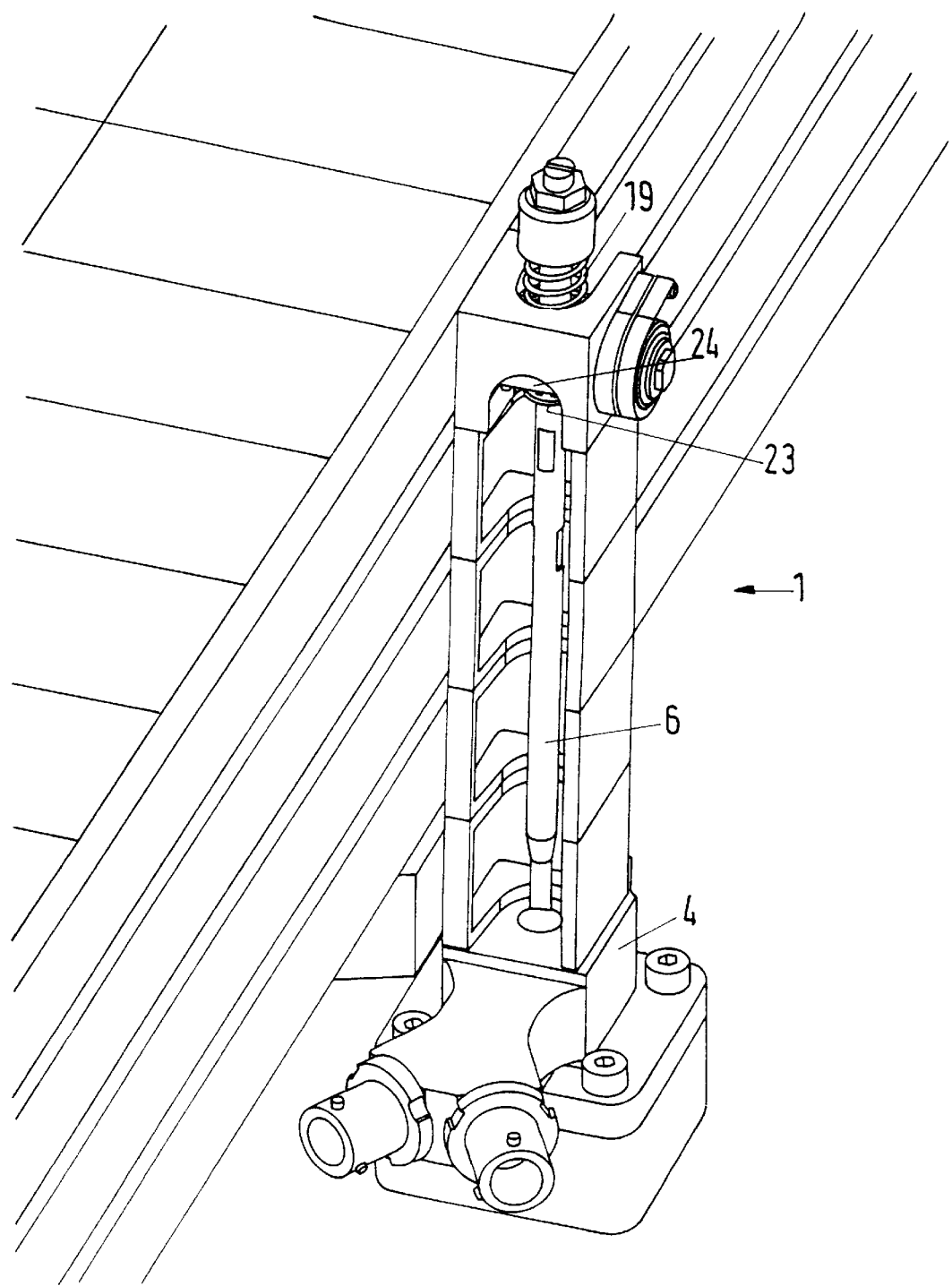
FIG. 2 is a perspective view of the holding-down device after the holding-down bolt has been shorn off.

FIG. 2 shows the holding-down device 1 shortly after the holding-down bolt 6 has been shorn off. The compression spring 19 has now pressed the stop element 23 against the bearing bush 24, and the holding-down bolt 6 has been pushed out of the striking pin device 4.

Figure 3:
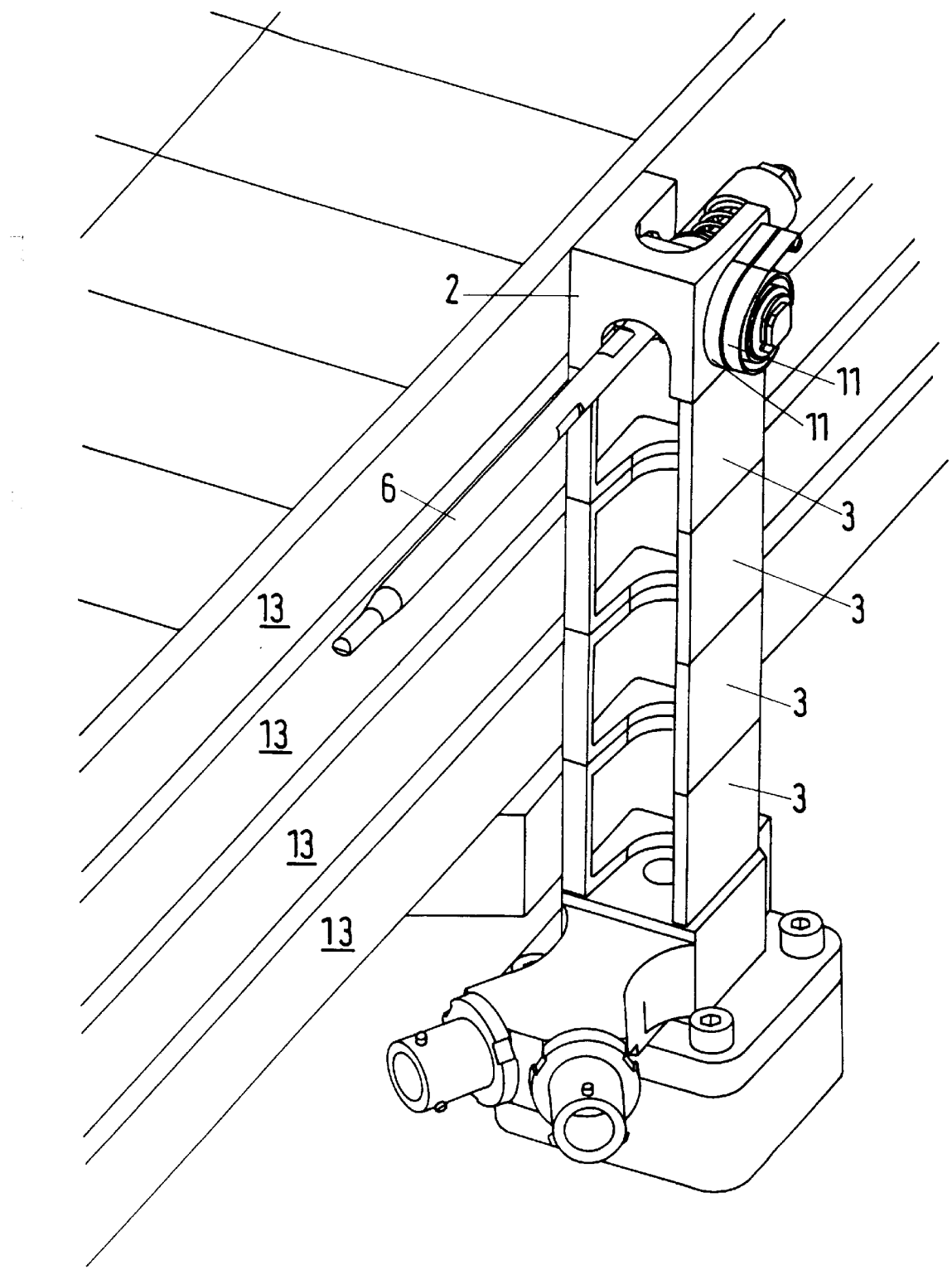
FIG. 3 is a perspective view similar to that in FIG. 2 with the holding-down bolt pivoted up.

Corresponding to FIG. 3, the torsion springs 11 can now begin to function and pivot out the holding-down bolt 6 to the extent that it strikes the head part 2. As a consequence of this, the head part 2 and the spacers 3 are no longer clamped together, and the individual panels 13 can unfold unhindered.

While specific embodiments of the invention have been shown and described in detail to illustrate the application of the principles of the invention, it will be understood that the invention may be embodied otherwise without departing from such principles.

What is claimed is:

1. A combination of a fastening device and solar panels, the combination comprising:

solar panels:

a holding-down bolt positioned on an outer side of said solar panels and for holding down the solar panels;

means for shearing off said holding bolt and causing said holding-down bolt to release the solar panels;

a plurality of U-shaped spacers are each attached to one of the solar panels by crossbolts having a U-shaped leg, said holding-down bolt being positioned in said plurality of U-shaped spacers; and pivoting means in one of said spacers and for pivoting said holding-down bolt into a position substantially parallel to one of the panels when said means for shearing shears said holding-down bolt.

2. The combination in accordance with claim 1, wherein:

a lifting means is positioned in one of said spacers for axially moving said holding-down bolt out of said means for shearing after said shearing of said holding-down bolt;

said pivoting means pivots said holding-down bolt after said holding-down bolt is moved out of said shearing means.

3. The combination in accordance with claim 1, wherein:

one of said plurality of spacers is a head part, said head part including a block defining an opening, said holding-down bolt passing through said opening, said head part also including a sleeve, a pretensioned spring and an end nut for attaching said holding-down bolt to said head part through said sleeve and said spring.

4. The combination in accordance with claim 1, wherein:

said means for shearing includes pyrotechnically acting striking pin device with a striking pin capable of shearing off said holding-down bolt is arranged under a lowermost of said plurality of spacers.

5. The combination in accordance with claim 4, wherein:

a base plate is located on an opposite side of said striking pin device from said plurality of spacers;

an alignment pin guides said holding-down bolt in a said base plate;

a base nut tensions said holding-down bolt against said striking pin device.

6. The combination in accordance with claim 4, wherein:

said block includes a pin passing through to an outside of said head part;

lifting spring means is positioned in said head part and for lifting said holding-down bolt out of said striking pin device after said striking pin device shears said holding-down bolt;

said pivoting means includes torsion spring means arranged on said pin for pivoting said holding-down bolt out of said spacers after said holding down bolt has been severed with the striking pin and after said holding down bolt has been moved by said lifting spring means, whereby the solar panels can be freely unfolded.

7. The combination in accordance with claim 1, wherein:

said plurality of spacers are attached to an outside edge each of intermediate panel of the panels, each of said plurality of spacers being positioned to be aligned with and in contact with each other when the panels are in a stacked position;

said holding-down bolt extends through said plurality of spacers in a direction substantially perpendicular to a plane of the panels.

8. The combination for holding down and releasing panels, the combination comprising:

a plurality of panels including end panels and intermediate panels;

a base;

an end appendage positioned on an edge of an end panel of the panels when the panels are in a stacked position;

a holding-down bolt attached to said end appendage and said base;

shearing means positioned in said base and for shearing said holding-down bolt;

pivoting means positioned in said end appendage and for pivoting said holding-down bolt into a position parallel to said edge of the end panel when said shearing means shears said holding-down bolt.

9. The combination in accordance with claim 8, wherein:

a plurality of intermediate appendages are attached to an outside edge of said each of intermediate panels, each of said plurality of intermediate appendages are positioned to be aligned with and in contact with each other and said base when the panels are in said stacked position;

said holding-down bolt extends through said plurality of appendages in a direction substantially perpendicular to a plane of the panels.

10. The combination in accordance with claim 8, wherein:

a lifting means is positioned in said end appendage for axially moving said holding-down bolt out of said shearing means after said shearing means shears said holding-down bolt, said pivoting means pivoting said holding-down bolt after said holding-down bolt is moved out of said shearing means.

11. A solar panel fastening arrangement, comprising:

a first solar panel;

a second solar panel a first U-shaped spacer having a first spacer crossbolt attached to said first solar panel;

a second U-shaped spacer having a second spacer crossbolt attached to said first solar panel;

a holding-down bolt positioned in said plurality of U-shaped spacers, said holding-down bolt being connected to said solar panels at an outer side of said solar panels via said U-shaped spacers;

a bolt shearing device positioned adjacent to said holding-down bolt; and a pivot in one of said spacers for pivoting said holding-down bolt into a position substantially parallel to one of said first panel and said second panel when said shearing mechanism shears said holding-down bolt.

* * * * *